(12) United States Patent
Washio

(10) Patent No.: US 9,080,353 B2
(45) Date of Patent: Jul. 14, 2015

(54) LOCK MECHANISM OF MOBILE MEMBER

(75) Inventor: Yosuke Washio, Hiroshima (JP)

(73) Assignee: NIFCO INC., Yokohama-Shi, Kanagawa (JP)

( * ) Notice: Subject to any disclaimer, the term of this patent is extended or adjusted under 35 U.S.C. 154(b) by 563 days.

(21) Appl. No.: 12/998,661

(22) PCT Filed: Nov. 16, 2009

(86) PCT No.: PCT/JP2009/069437
§ 371 (c)(1),
(2), (4) Date: Jun. 17, 2011

(87) PCT Pub. No.: WO2010/058752
PCT Pub. Date: May 27, 2010

(65) Prior Publication Data
US 2011/0241358 A1     Oct. 6, 2011

(30) Foreign Application Priority Data

Nov. 19, 2008   (JP) .................... 2008-295161

(51) Int. Cl.
| | |
|---|---|
| E05C 19/10 | (2006.01) |
| E05B 83/30 | (2014.01) |
| B60R 7/06 | (2006.01) |
| E05B 77/06 | (2014.01) |
| E05B 85/14 | (2014.01) |
| E05B 83/32 | (2014.01) |

(52) U.S. Cl.
CPC . *E05B 83/30* (2013.01); *B60R 7/06* (2013.01); *E05B 77/06* (2013.01); *E05B 83/32* (2013.01); *E05B 85/14* (2013.01); *Y10T 292/0934* (2015.04)

(58) Field of Classification Search
USPC .................... 292/128, DIG. 17, DIG. 30
See application file for complete search history.

(56) References Cited

U.S. PATENT DOCUMENTS

| | | | | |
|---|---|---|---|---|
| 1,840,037 A | * | 1/1932 | Johansson | 292/228 |
| 2,029,199 A | * | 1/1936 | Segar | 292/173 |

(Continued)

FOREIGN PATENT DOCUMENTS

| | | |
|---|---|---|
| DE | 4336619 C1 | 2/1995 |
| DE | 19929022 A1 | 1/2001 |

(Continued)

OTHER PUBLICATIONS

Europe Patent Office, "Search Report for EP 09827533.2," Sep. 29, 2014.

*Primary Examiner* — Mark Williams
(74) *Attorney, Agent, or Firm* — Manabu Kanesaka

(57) ABSTRACT

A lock mechanism (for example, a small object storage device for a vehicle) includes a base (for example, a housing), a mobile member, and a lock device. The lock device includes a lock portion; a knob; a return spring; an elongate hole for movably supporting at least one end portion of a rotational axis along a moving direction (for example, a sliding direction) of the mobile member; an urging device (for example, the return spring also serving as the urging device) for urging one end portion of the rotational axis toward a position of a front side of the elongate hole; and a rotation blocking portion for blocking a rotation of the knob when the one end portion of the rotational axis moves toward a deep side of the elongate hole against an urging force of the urging device (for example, the return spring also serving as the urging device).

9 Claims, 8 Drawing Sheets

(56) References Cited

U.S. PATENT DOCUMENTS

| | | | | |
|---|---|---|---|---|
| 2,634,997 | A | * | 4/1953 | Gallowitz ...................... 292/128 |
| 2,773,715 | A | * | 12/1956 | Lindner ........................ 292/252 |
| 4,003,593 | A | * | 1/1977 | Wilzig et al. .................... 292/92 |
| 4,915,428 | A | * | 4/1990 | Hayakawa ...................... 292/29 |
| 5,630,630 | A | * | 5/1997 | Price et al. ..................... 292/128 |
| 6,382,688 | B1 | | 5/2002 | Agostini |
| 6,648,382 | B1 | | 11/2003 | Monig et al. |
| 6,698,262 | B2 | | 3/2004 | Wittwer |
| 2002/0096892 | A1 | | 7/2002 | Sato et al. |
| 2006/0038417 | A1 | * | 2/2006 | Pudney ...................... 292/336.3 |

FOREIGN PATENT DOCUMENTS

| | | |
|---|---|---|
| EP | 1052354 A2 | 11/2000 |
| JP | H02-076546 | 3/1990 |
| JP | U H03-35020 | 7/1991 |
| JP | U H05-47234 | 12/1993 |
| JP | 2565196 Y | 12/1997 |
| JP | 2000-110433 | 4/2000 |
| WO | 01/75252 A1 | 10/2001 |

* cited by examiner

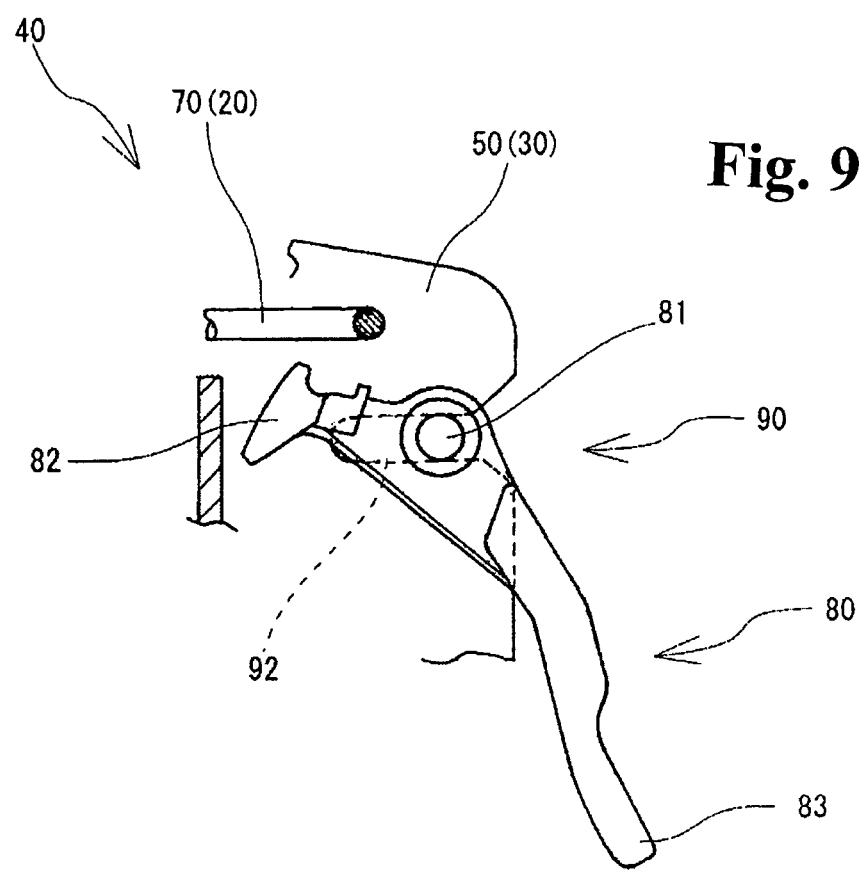

LOCK MECHANISM OF MOBILE MEMBER

FIELD OF TECHNOLOGY

The present invention relates to a lock mechanism of a mobile member, for example, in a case of being attached to an inside of a vehicle interior, at a time of a sudden stop or a crash of a vehicle, the lock mechanism of the mobile member can prevent the mobile member from abruptly moving and protruding beforehand.

BACKGROUND ART

Conventionally, there have been proposed various types of mechanisms for preventing a locked state from being released and a glove compartment from being opened when an impact is applied to the glove compartment or a knob for unlocking the glove compartment (for example, see Patent Documents 1 to 3).

For example, when the knob is pushed by the impact, a protruded portion protruding from the knob is fitted in a concave groove of a lock main body, and blocks a rotation of the knob (see paragraph number [0017] and FIG. 4 of the Patent Document 1).

Also, when the impact is applied to the glove compartment, a stopper is deformed, and a lock portion is clamped, so that a rotation of the lock portion is blocked (pages 8, and 3 to 15, and FIG. 4 of the Patent Document 2).

Moreover, at the time of the crush of the vehicle, when an instrument panel is deformed, a rotation of a hook is blocked by a stopper portion (see paragraph numbers [0017] and [0018], and FIG. 4 of the Patent Document 3).

PRIOR ART DOCUMENT

Patent Document

Patent Document 1: Japanese Published Utility Model Registration No. 2565196 (paragraph number [0017] and FIG. 4)

Patent Document 2: Japanese Published Unexamined Patent Application No. H02-76546 (pages 8, and 3 to 15, and FIG. 4)

Patent Document 3: Japanese Published Unexamined Patent Application No. 2000-110433 (paragraph numbers [0017] and [0018], and FIG. 4)

SUMMARY OF THE INVENTION

Problems to be Solved by the Invention

However, all the above-mentioned conventional mechanisms were made so as to assume a case in which the impact at the time of the crush was applied to a direction closing the glove compartment, so that there was a problem such that at the time of the sudden stop or the crash of the vehicle, the mobile member attempted to protrude by an inertial force cannot be prevented from being unlocked by the glove compartment.

Thereupon, the present invention is made in view of the problem of the above-mentioned conventional technology, and an object of the present invention is as follows.

Namely, the present invention is made so as not to be able to release the locked state by an action of the inertial force and the like, and to prevent the mobile member from abruptly moving beforehand.

For example, in the case of being attached to the inside of the vehicle interior, at the time of sudden stop or crash of the vehicle, the lock mechanism of the mobile member can prevent the mobile member from abruptly moving and protruding beforehand.

Means for Solving the Problems

The present invention has the following features.

First, a lock mechanism (for example, a small object storage device for a vehicle) comprises the following structure.

Incidentally, although as the lock mechanism, the small object storage device for the vehicle is exemplified, this is not limited to the above, and may be a table, cup holder, ashtray, or the like. Also, an attachment position is not limited to a car, and may be other vehicles, furniture, office equipment, or the like.

(1) Base (for Example, a Housing)

Incidentally, as a base, although the housing is exemplified, this is not limited to the above.

(2) Mobile Member

A mobile member is movably supported relative to the base (for example, the housing).

(3) Lock Device

The lock device is disposed between the base (for example, the housing) and the mobile member, and locks the mobile member.

Secondly, the lock device comprises the following structure.

(4) Lock Portion

A lock portion is provided in either one (for example, the housing) of the base (for example, the housing) or the mobile member, and locks in a state wherein the mobile member is housed in the base (for example, the housing).

(5) Knob

A knob is rotatably supported to the other (for example, the mobile member) of the base (for example, the housing) or the mobile member, and includes a locking portion, which is hooked in the lock portion, on one end portion by sandwiching a rotational axis thereof, and an operating portion capable of releasing a locked state of the locking portion, which has been locked by being hooked in the lock portion by rotating, on the other end portion.

Incidentally, although the lock portion is provided in the base (for example, the housing), and the knob is rotatably supported to the mobile member, they are not limited to the above, and although this is not shown in the figures, contrarily, the knob may be rotatably supported to the base (for example, the housing), and the lock portion may be provided in the mobile member.

(6) Return Spring

A return spring is for urging the locking portion toward a direction of being hooked in the lock portion.

Thirdly, the lock device comprises the following structure.

(7) Elongate Hole

An elongate hole is for movably supporting at least one end portion of the rotational axis along a moving direction (for example, a sliding direction) of the mobile member.

(8) Urging Means (for Example, the Return Spring also Serving as the Urging Means)

For example, as shown in FIG. 6, the urging means (for example, the return spring also serving as the urging means) is for urging one end portion of the rotational axis toward a position of an immediate front side of the elongate hole.

(9) Rotation Blocking Portion

A rotation blocking portion is for blocking a rotation of the knob when one end portion of the rotational axis moves toward a deep side of the elongate hole against an urging force of the urging means (for example, the return spring also serving as the urging means).

The return spring may also serve as the urging means (for example, the return spring also serving as the urging means).

Consequently, by serving the return spring and the urging means as the same member, the number of parts, or the number of assembly processes can be reduced.

The rotation blocking portion may abut against the locking portion.

Consequently, by abutting the locking portion having a relatively high rigidity against the rotation blocking portion, the knob can be prevented from damage.

The lock mechanism according to the present invention may be structured as follows.

First, the mobile member is disposed so as to protrude toward a front from a back of the vehicle (not shown in the figures).

Secondly, in a state wherein the locking portion is locked in the lock portion, when the mobile member attempts to move in a protruding direction, one end portion of the rotational axis is allowed to move toward the deep side of the elongate hole.

Consequently, the mobile member can be prevented from abruptly protruding toward the front from the back of the vehicle.

Effect of the Invention

Since the present invention is structured as above, effects described hereinafter can be provided.

Releasing of the locked state of the mobile member due to an action of an inertia force and the like and abrupt movement can be prevented beforehand.

For example, in a case of being attached to an inside of a vehicle interior, at a time of a sudden stop or a crash of the vehicle, the present invention can prevent the mobile member from abruptly moving and protruding beforehand.

BRIEF DESCRIPTION OF THE DRAWINGS

FIG. 9 corresponds to FIG. 1, and is a side view showing an unlocked state.

BEST MODES OF CARRYING OUT THE INVENTION

Explanation of Drawings

FIGS. 1 to 9 respectively show one example of an embodiment of the present invention.

Figure 1:
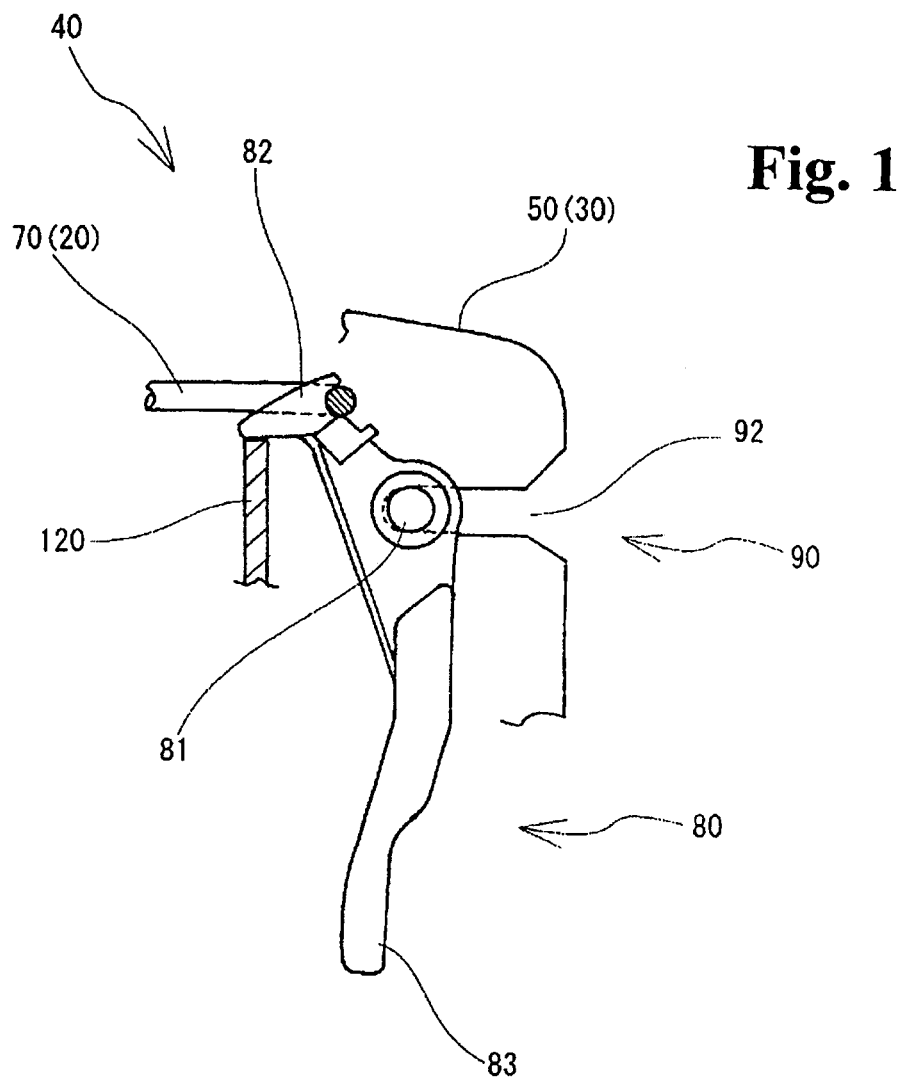
FIG. 1 is a side view of a lock device in a state wherein a rotation of a knob is blocked.
Figure 2:
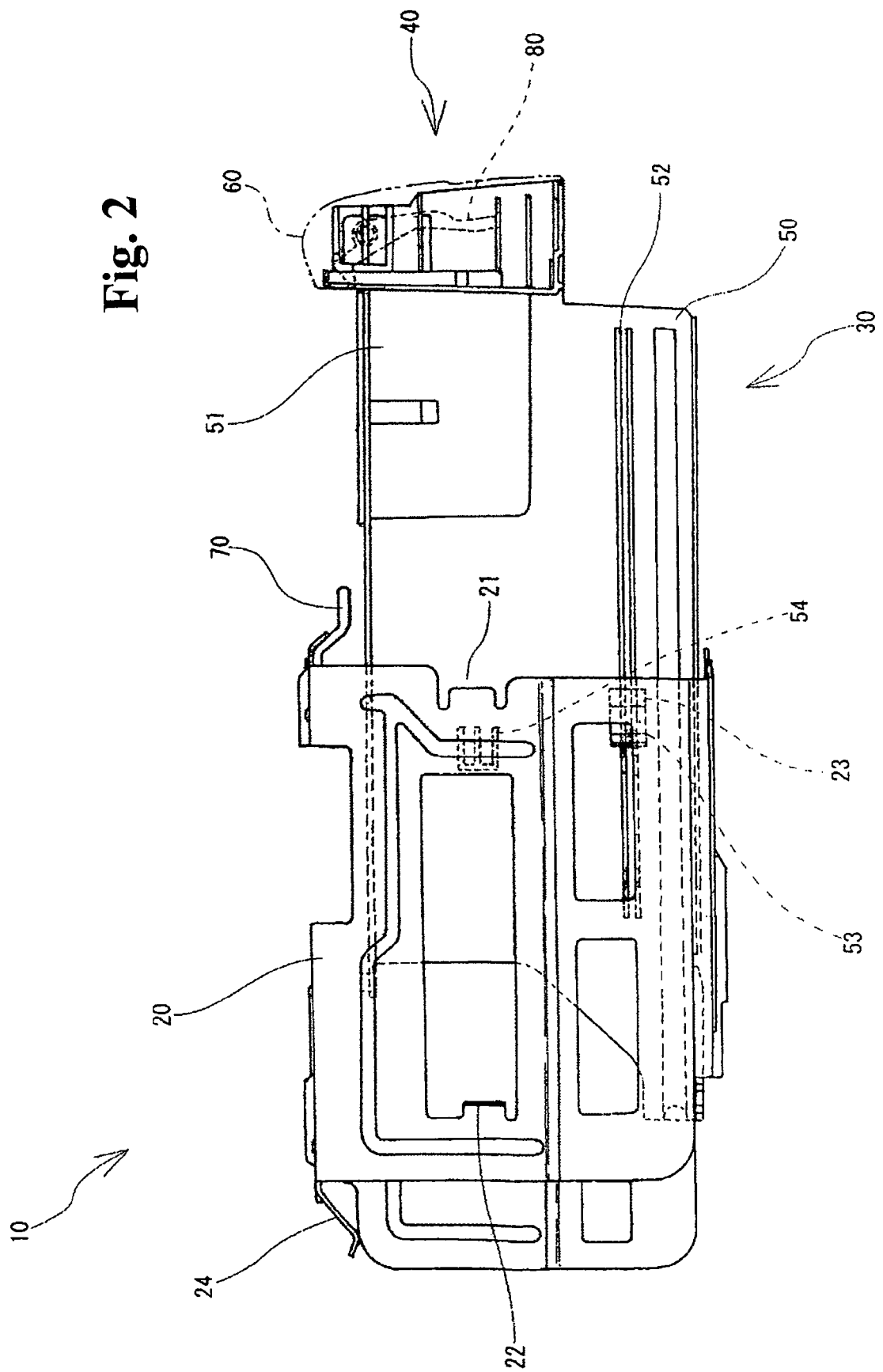
FIG. 2 is a side view of a small object storage device for a vehicle in a state wherein a mobile member is protruded.
Figure 3:
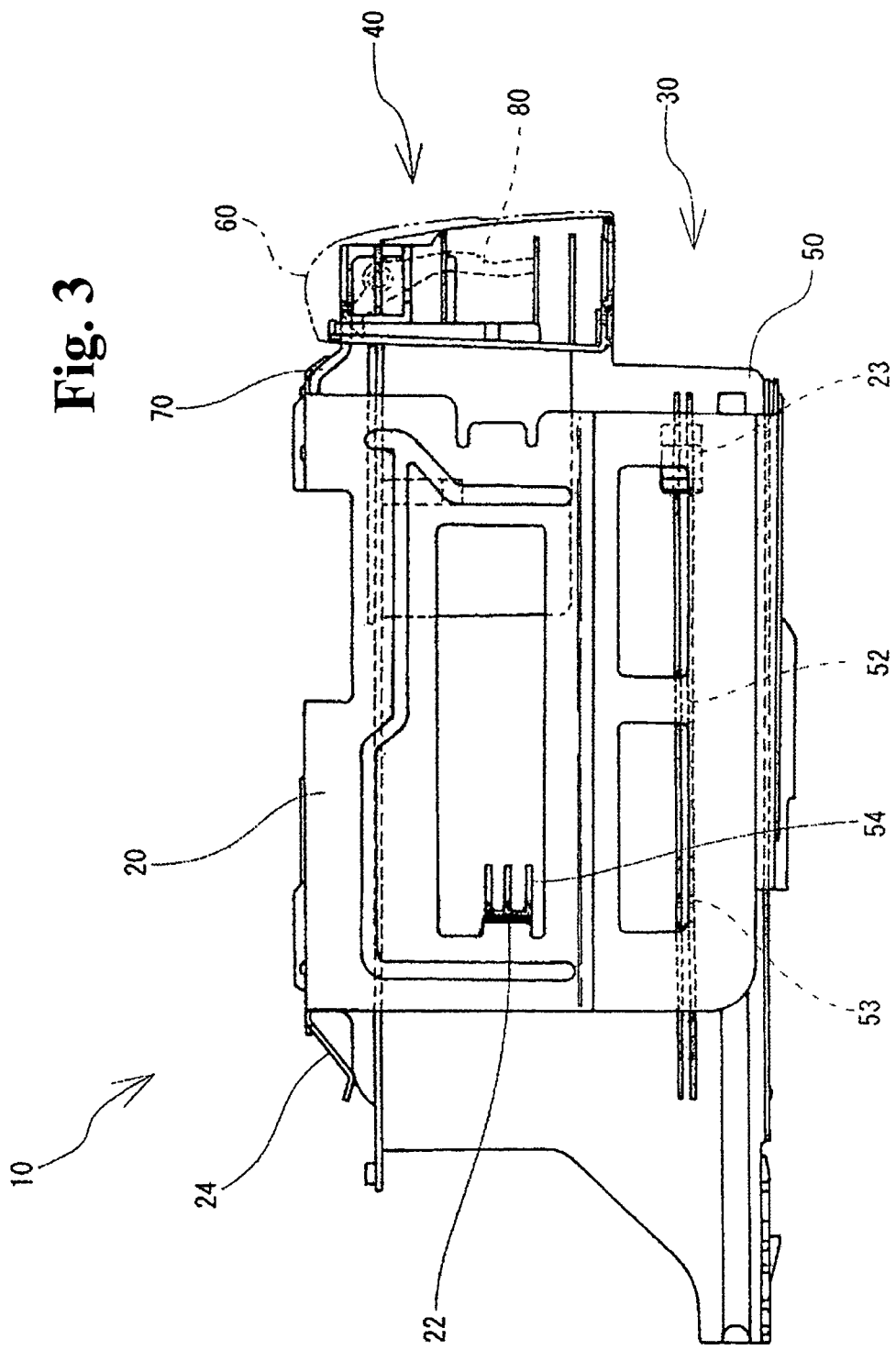
FIG. 3 is a side view of a state wherein the mobile member is housed.
Figure 4:
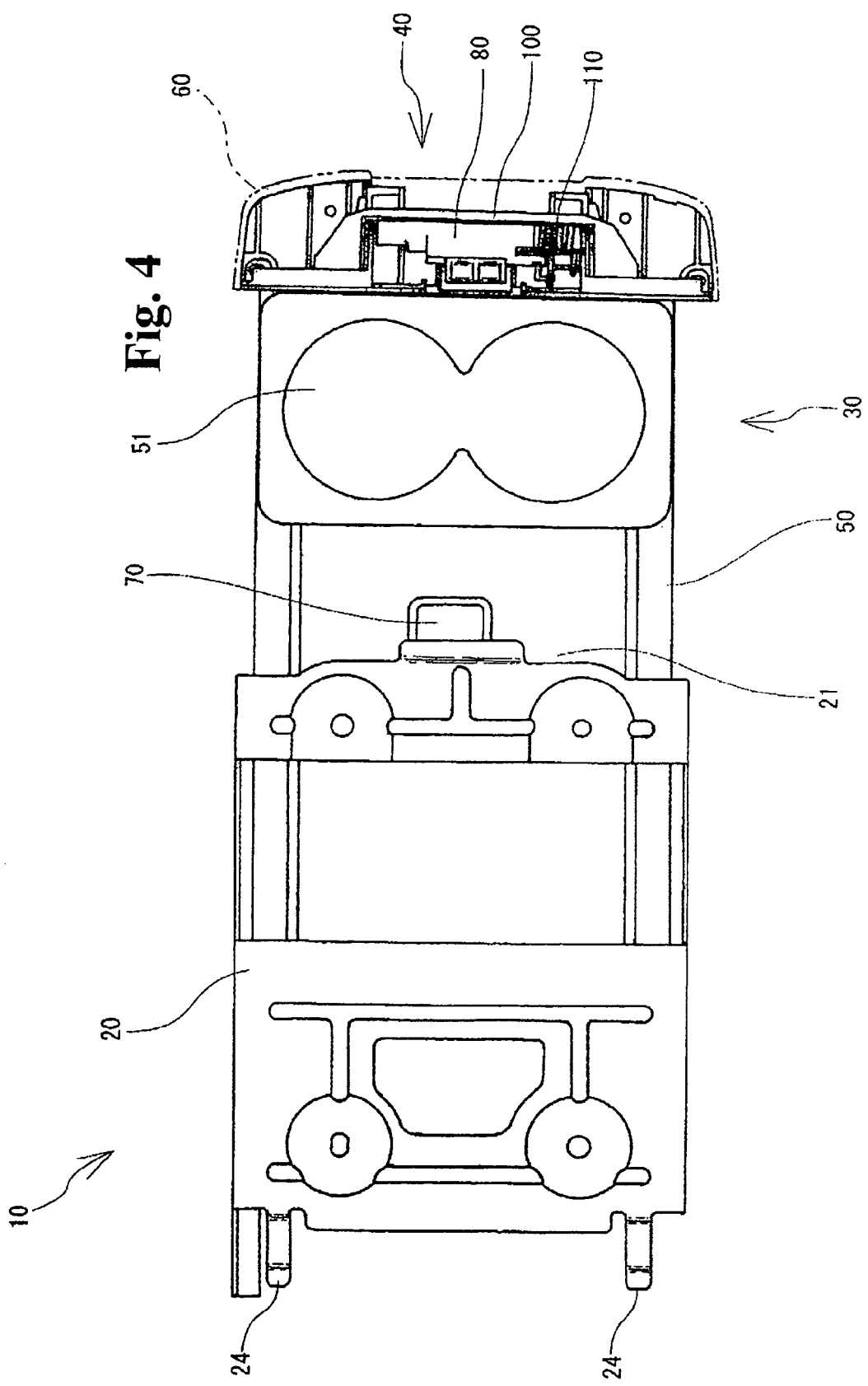
FIG. 4 corresponds to FIG. 2, and is a plan view of the small object storage device for the vehicle in the state wherein the mobile member is protruded.
Figure 5:
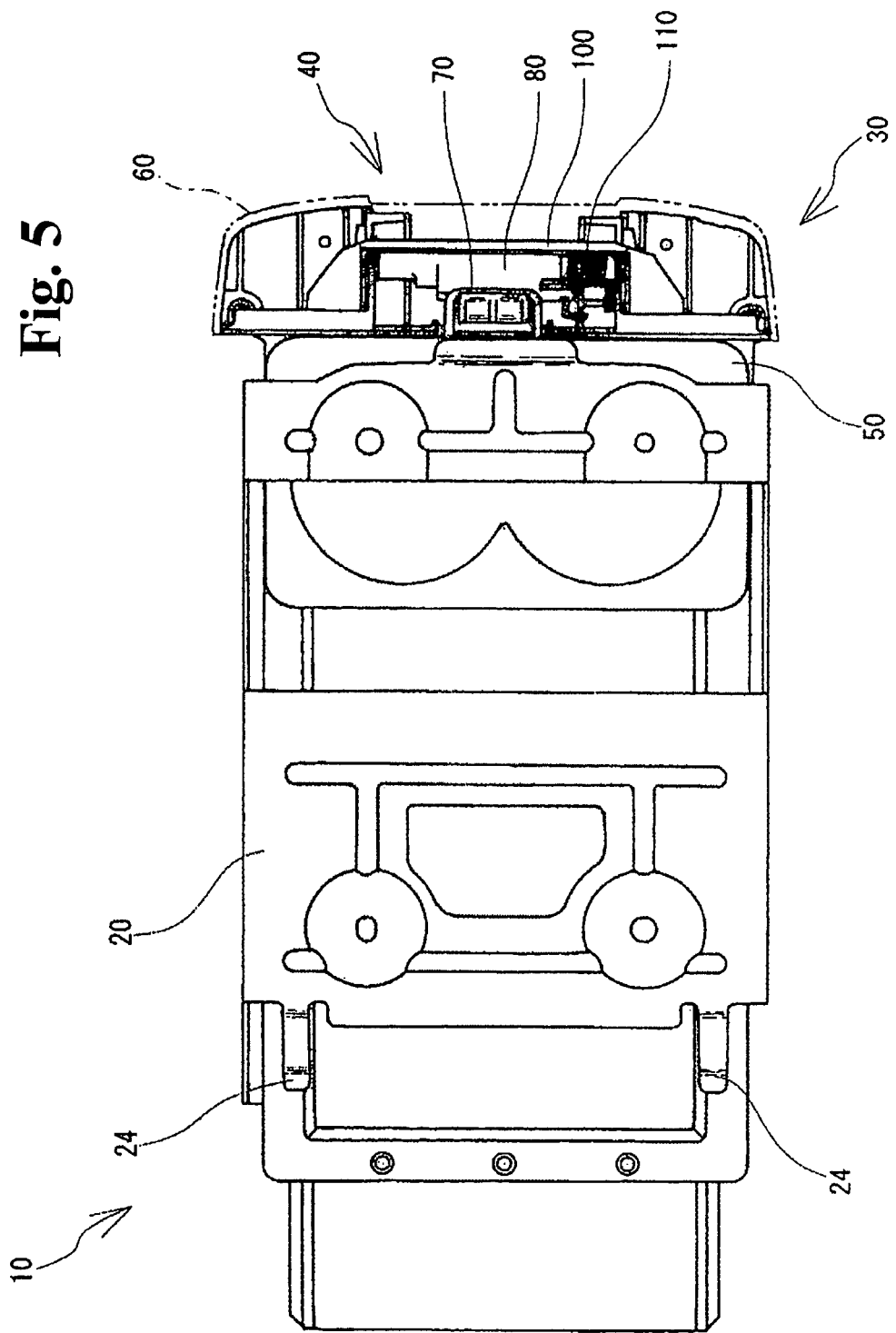
FIG. 5 corresponds to FIG. 3, and is a plan view of the state wherein the mobile member is housed.
Figure 6:
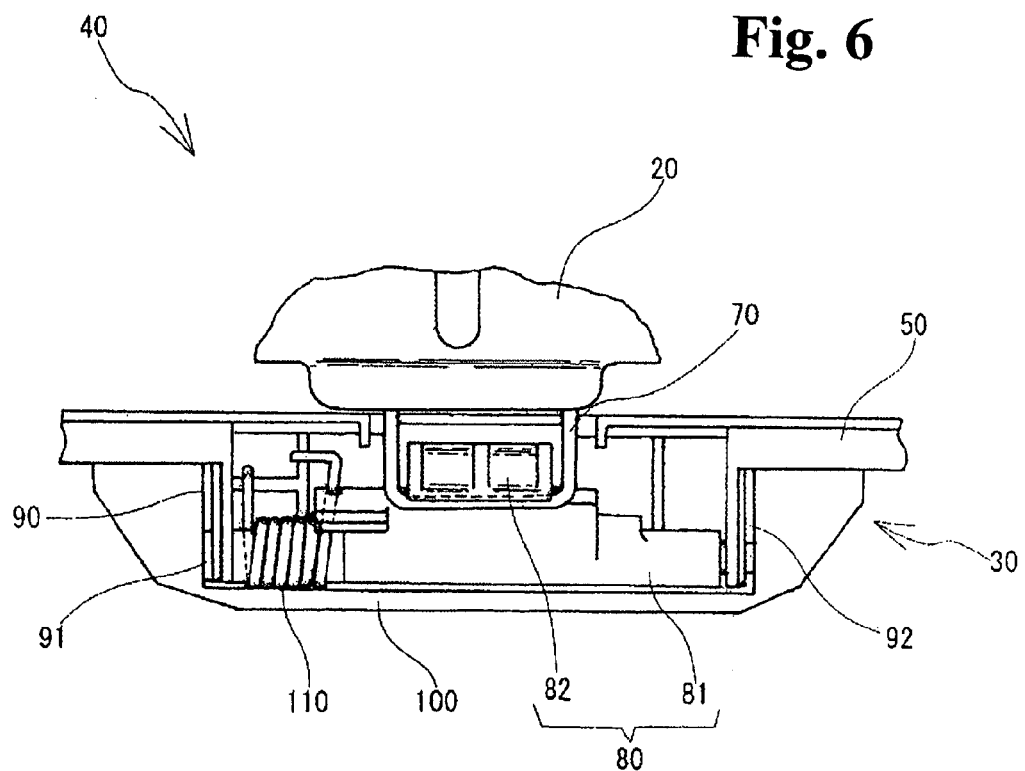
FIG. 6 is a plan view of the lock device.
Figure 7:
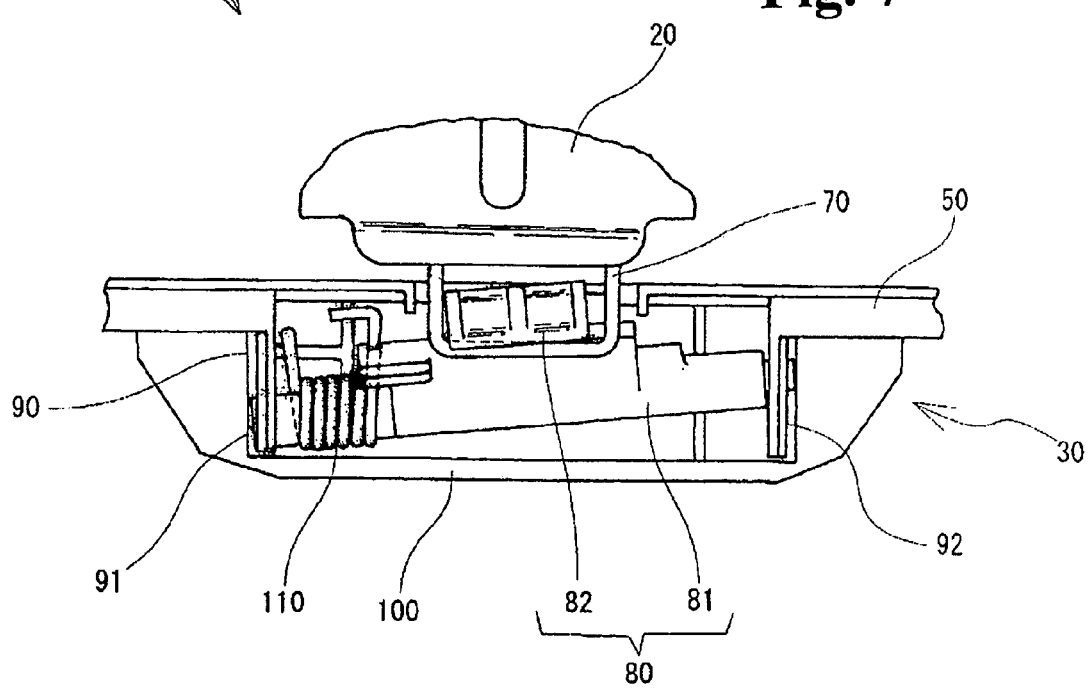
FIG. 7 corresponds to FIG. 6, and is a plan view of the state wherein the rotation of the knob is blocked.
Figure 8:
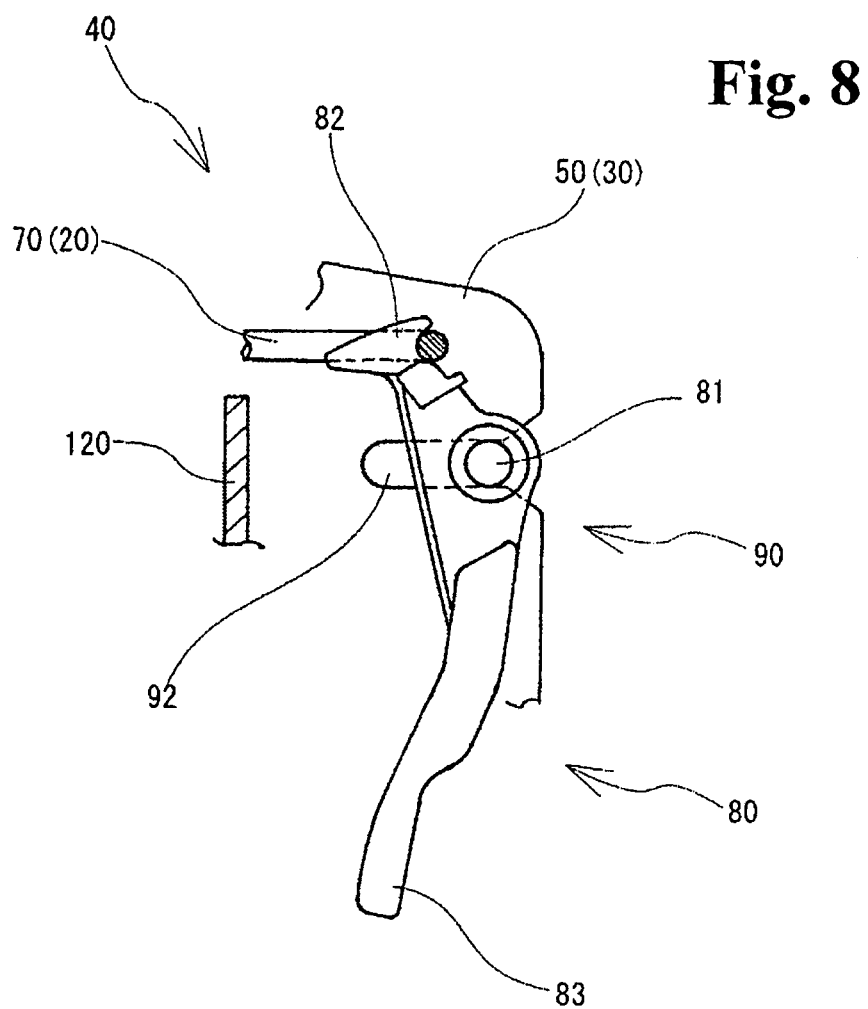
FIG. 8 corresponds to FIG. 1, and is a side view showing a locked state.

FIG. 1 is a side view of a lock device in a state wherein a rotation of a knob is blocked; FIG. 2 is a side view of a small object storage device for a vehicle in a state wherein a mobile member is protruded; FIG. 3 is a plan view of the small object storage device for the vehicle in the state wherein the mobile member is protruded; FIG. 4 corresponds to FIG. 2, and is a side view of a state wherein the mobile member is housed; FIG. 5 corresponds to FIG. 3, and is a plan view of the state wherein the mobile member is housed; FIG. 6 is a plan view of the lock device; FIG. 7 corresponds to FIG. 6, and is a plan view of the state wherein the rotation of the knob is blocked; FIG. 8 corresponds to FIG. 1, and is a side view showing a locked state; and FIG. 9 corresponds to FIG. 1, and is a side view showing an unlocked state, respectively.

(Small Object Storage Device 10 for a Vehicle)

In FIGS. 2 to 4, the reference numeral 10 represents a small object storage device for a vehicle, and although it is not shown in the drawings, the small object storage device for the vehicle is disposed in an inside of a vehicle interior.

The above-mentioned small object storage device 10 for the vehicle is one example of a lock mechanism of a mobile member 30. The lock mechanism is not limited to the small object storage device 10 for the vehicle, and may be a table, cup holder, ashtray, or the like. Also, an attachment position of the lock mechanism is not limited to a car, and may be other vehicles, furniture, office equipment, or the like.

As shown in FIGS. 2 to 5, the small object storage device 10 for the vehicle roughly comprises the following portions.

Incidentally, the following (1) to (3) will be explained hereinafter.

(1) Housing 20
(2) Mobile member 30
(3) Lock device 40

Incidentally, the portions of the small object storage device 10 for the vehicle are not limited to the above-mentioned (1) to (3).

(Housing 20)

As shown in FIGS. 2 and 4, the housing 20 includes an opening portion 21 at least in a front face.

The above-mentioned housing 20 is one example of a base. The base is not limited to the housing 20.

Specifically, the housing 20 is made from metal, and formed in a box shape whose front and back faces are open. Although it is not shown in the figures, the housing 20 is fixed to the inside of the vehicle interior.

On the other hand, the housing 20 comprises each following portion.

Incidentally, each portion of the housing 20 is not limited to the following (1) to (4).

(1) Opening Portion 21

Although the following is not shown in the figures, when the housing 20 is fixed to the inside of the vehicle interior, the opening portion 21 opens toward a front from a back of the vehicle.

(2) Retracted-Position Control Portions 22

Retracted-position control portions 22 are positioned on deep sides of the housing 20, and protrude toward the inside with a pair from right-and-left side faces. As shown in FIG. 3, the retracted-position control portions 22 abut against retracted-position control portions 54 of the mobile member 30 described hereinafter so as to control the most retracted position of the mobile member 30.

(3) Elastic Sliding Portions 23

Elastic sliding portions 23 are positioned on immediate front sides of the housing 20, and elastically protrude toward the inside with a pair from the right-and-left side faces. A plan face of the elastic sliding portions 23 has an approximately "V" shape, or is folded in a mountain shape. As shown in FIGS. 2 and 3, the elastic sliding portions 23 elastically slide and contact guide ribs 52 of the mobile member 30 described hereinafter so as to provide a sliding resistance to the mobile member 30.

(4) Rising Control Portions 24

Rising control portions 24 are positioned on deep sides of the housing 20, and protrude downwardly with a pair from right-and-left both sides of an upper face. A plan face of the rising control portions 24 has an approximately "V" shape, or is folded in a mountain shape. As shown in FIGS. 2 and 3, the rising control portions 24 slide and contact an upper margin of the mobile member 30 so as to control a rise of the mobile member 30.

(Mobile Member 30)

As shown in FIGS. 2 to 5, the mobile member 30 is movably supported relative to the housing 20 which is the base.

Namely, the mobile member 30 is housed in the housing 20, and protrudes through the opening portion 21.

Specifically, the mobile member 30 is made of synthetic resin, and formed in a box shape whose upper surface is open. Then, the mobile member 30 is slidably supported to the housing 20, and although the following is not shown in the figures, the mobile member 30 protrudes toward the front from the back of the vehicle.

Incidentally, as shown in FIGS. 2 and 4, the mobile member 30 is slidably supported to the housing 20. However, this is not limited to the above, and although the following is not shown in the figures, the mobile member 30 may be rotatably supported to the housing 20.

On the other hand, the mobile member 30 roughly comprises the following portions.

Incidentally, the following (1) and (2) will be explained hereinafter.

(1) Mobile-Body Main Body 50

(2) Lid 60

Incidentally, portions of the mobile member 30 are not limited to the above-mentioned (1) and (2).

(Lock Device 40)

As shown in FIGS. 1 and 6, the lock device 40 is disposed between the housing 20, which is the base, and the mobile member 30, and locks the mobile member 30.

In the present embodiment, the lock device 40 locks in a state wherein the mobile member 30 is housed in the housing 20.

Specifically, the lock device 40 comprises the following portions.

Incidentally, the following (1) to (6) will be described hereinafter.

(1) Lock portion 70

(2) Knob 80

(3) Bearing portions 90

(4) Cover 100

(5) Return spring 110

(6) Rotation blocking portion 120

Incidentally, the portions of the lock device 40 are not limited to the above-mentioned (1) to (6).

(Mobile-Body Main Body 50)

The mobile-body main body 50 is formed in a box shape whose upper face is open.

Specifically, as shown in FIGS. 2 to 6, the mobile-body main body 50 comprises each following portion.

Incidentally, each portion of the mobile-body main body 50 is not limited to the following (1) to (4).

(1) Cup Holder 51

As shown in FIGS. 2 and 4, a cup holder 51 is for retaining a container (not shown in the figures) of drinking water such as a cup, can, plastic bottle, or the like, and certifies the container in a state wherein the mobile-body main body 50 is protruded.

(2) Guide Ribs 52

As shown in FIGS. 2 and 4, the guide ribs 52 respectively protrude with a pair from right-and-left outside faces of the mobile-body main body 50, and are formed with plural numbers of pieces, for example, two pieces, in a rail shape along a sliding direction of the mobile-body main body 50. The guide ribs 52 slide and contact the elastic sliding portions 23 of the above-mentioned housing 20.

(3) Concave Portions 53

As shown in FIGS. 2 and 4, concave portions 53 are formed in a middle of a length of the guide ribs 52 so that the elastic sliding portions 23 of the above-mentioned housing 20 are fitted in. As shown in FIG. 2, in a position wherein the mobile-body main body 50 is protruded the most, the elastic sliding portions 23 of the housing 20 are fitted in the concave portions 53, so that the concave portions 53 provide a clicking feature.

(4) Retracted-Position Control Portions 54

As shown in FIGS. 2 and 4, the retracted-position control portions 54 are positioned on deep sides of the mobile-body main body 50, and respectively protrude with a pair from right-and-left outside faces of the mobile-body main body 50. As shown in FIG. 4, the retracted-position control portions 54 control the most retracted position of the mobile member 30 by abutting against the retracted-position control portions 22 of the housing 20.

(Lid 60)

As shown in FIGS. 2 to 5, the lid 60 covers an upper portion of a front face of the mobile-body main body 50, and the lock device 40 is disposed between the front face of the mobile-body main body 50.

(Lock Portion 70)

As shown in FIGS. 1 and 6, the lock portion 70 is for locking either one of the housing 20 or the mobile member 30 in a state wherein the mobile member 30 is housed in the housing 20.

Specifically, as shown in FIGS. 2 to 5, the lock portion 70 is provided in the opening portion 21 of the housing 20, and as shown in FIG. 4, formed in a shape wherein a plan face of a metallic bar is folded in an approximately "U" shape. As shown in FIG. 2, from a view of a side face, the lock portion is formed so as to be a folded shape in an "L" shape downwardly.

(Knob 80)

As shown in FIGS. 1 and 6, a knob 80 is rotatably supported to the other of the housing 20 or the mobile member 30, and includes a locking portion 82, which is hooked in the lock portion 70, on one end portion by sandwiching a rotational axis 81 thereof, and an operating portion 83 capable of releasing a locked state of the locking portion 82, which has been locked by being hooked in the lock portion 70 by rotating, on the other end portion.

Specifically, as shown in FIGS. 1 and 6, the rotational axis 81 is rotationally supported to the mobile member 30 through bearing portions 90 described hereinafter.

As shown in FIGS. 1 and 6, the locking portion 82 extends upwardly from the rotational axis 81, and is formed in a hook shape which is hooked in the bar-like lock portion 70 of the housing 20.

As shown in FIGS. 1 and 6, the operating portion 83 extends downwardly from the rotational axis 81, and protrudes downwardly from the above-mentioned lid 60. Although it is not shown in the figures, the operating portion 83 can be pulled to an immediate front by hooking one's finger.

Incidentally, although the rotational axis 81 of the knob 80 is rotatably supported to the mobile member 30, and the above-mentioned lock portion 70 is provided in the housing 20, they are not limited to the above, and although it is not shown in the figures, the knob 80 may be rotatably supported to the housing 20, and the lock portion 70 may be provided in the mobile member 30.

(Bearing Portions 90)

As shown in FIG. 6, the bearing portions 90 protrude toward an immediate front side from right and left of the front face of the mobile-body main body 50 with a pair, and rotatably support both end portions of the rotational axis 81 of the knob 80.

Specifically, as shown in FIGS. 1 and 6, the bearing portions 90 include each following portion.

Incidentally, each portion of the bearing portions 90 is not limited to the following (1) and (2).

(1) Circular Hole 91

As shown in FIGS. 1 and 6, a circular hole 91 is formed on one side of one of the bearing portions 90, and rotatably supports one end portion of the rotational axis 81 of the knob 80.

Specifically, the circular hole 91 is formed in a "U" shape of a cross-sectional surface whose immediate front side is open, and formed in an approximately circular shape by covering an opening end by the cover 100 described hereinafter.

(2) Elongate Hole 92

As shown in FIGS. 1 and 6, an elongate hole 92 is formed on one side of the other of the bearing portions 90, and as shown in FIGS. 1 and 7, the elongate hole 92 movably supports the other end portion of the rotational axis 81 along a moving direction, i.e., a sliding direction of the mobile member 30.

Then, in the state wherein the locking portion 82 is locked in the lock portion 70, as shown in FIG. 7, when the mobile member 30 attempts to move in a protruding direction, one end portion of the rotational axis 81 moves toward a deep side of the elongate hole 92.

Specifically, as in the case of the circular hole 91, the elongate hole 92 is formed in a "U" shape of a cross-sectional surface whose immediate front side is open, and formed in an approximately oval shape by covering an opening end by the cover 100 described hereinafter.

Incidentally, on one side of one of the bearing portions 90, the circular hole 91 is formed, and on one side of the other of the bearing portions 90, the elongate hole 92 is formed. However, the holes are not limited to the above, and the elongate hole 92 may be formed on both sides of the bearing portions 90.

(Cover 100)

As shown in FIGS. 1 and 6, the cover 100 is for preventing the rotational axis 81 of the knob 80 from falling out of the bearing portions 90 by covering an immediate front side of the bearing portions 90 on both sides, and fixed to the front face of the mobile-body main body 50.

(Return Spring 110)

As shown in FIG. 6, the return spring 110 is for urging the locking portion 82 toward a direction of being hooked in the lock portion 70.

Specifically, in the return spring 110, one end portion thereof is hooked in the mobile member 30, and the other end portion is hooked in the knob 80 respectively by using a string spiral spring, and due to a restoring force of the spring, in FIG. 8, a clockwise rotational force is provided as a center of the rotational axis 81.

Also, as shown in FIG. 6, the return spring 110 also serves as urging means.

As shown in FIG. 6, the above-mentioned urging means is for urging the other end portion of the rotational axis 81, which has been fitted in the elongate hole 92, toward a position of an immediate front side of the elongate hole 92.

Incidentally, although the return spring 110 also serves as the urging means, this is not limited to the above, and the return spring 110 and the urging means may be provided separately.

(Rotation Blocking Portion 120)

As shown in FIGS. 1 and 7, the rotation blocking portion 120 is for blocking a rotation of the knob 80 when the other end portion of the rotational axis 81, which has been fitted in the elongate hole 92, moves toward the deep side of the elongate hole 92 against an urging force of the return spring 110 also serving as the urging means.

Specifically, as shown in FIGS. 1 and 7, the rotation blocking portion 120 abuts against the locking portion 82.

Namely, although it is not shown in the figures, the rotation blocking portion 120 is notched at a front margin on an immediate front side of the mobile-body main body 50 in a concave shape downwardly from an upper margin thereof, and a width of the notch is set larger than a horizontal width of the locking portion 82 of the knob 80. Then, as shown in FIG. 1, the rotation blocking portion 120 blocks the rotation of the knob 80 by abutting a bottom of the notch of the concave shape against the locking portion 82 of the knob 80.

Incidentally, although the rotation blocking portion 120 abuts against the locking portion 82 of the knob 80, this is not limited to the above, and the operating portion 83 of the knob 80 may abut. Also, although the rotation blocking portion 120 is formed by notching the mobile-body main body 50, this is not limited to the above, and the rotation blocking portion 120 may be a separate part from the mobile-body main body 50.

(Usage)

Usage of the small object storage device 10 for the vehicle comprising the above-mentioned structure will be explained.

First, as shown in FIGS. 3 and 5, in a state wherein the mobile member 30 is housed inside the housing 20, the mobile member 30 is locked in a housed state by the lock device 40.

Namely, as shown in FIGS. 6 and 8, the hook-shaped locking portion 82 of the knob 80 is hooked in the bar-like lock portion 70 of the housing 20.

In order to protrude the mobile member 30 in the housed state, the mobile member 30 may be pulled out to an immediate front of the housing 20 by releasing a locked state of the lock device 40.

Namely, as shown in FIG. 9, when ones' finger is hooked on the operating portion 83 of the knob 80, and pulled to the immediate front, the knob 80 rotates as the center of the rotational axis 81, so that the hook-like locking portion 82 is disengaged downwardly from the bar-like lock portion 70 of the housing 20, and the locked state of the lock device 40 is released. Consequently, as shown in FIGS. 2 and 4, while ones' finger is being hooked on the operating portion 83 of the knob 80, by pulling the mobile member 30 to the immediate front, the mobile member 30 protrudes to an immediate front side from the housing 20.

(Explanation of a Blocked State of the Rotation of the Knob 80)

Next, a blocked state of the rotation of the knob 80 will be explained.

As shown in FIGS. 3 and 5, in a state wherein the mobile member 30 is housed inside the housing 20, when the vehicle suddenly stops, or crashes, the mobile member 30 attempts to protrude from the housing 20 due to an inertial force.

At this time, as shown in FIGS. 1 and 7, the other end portion of the rotational axis 81, which has been fitted in the elongate hole 92, resists the urging force of the return spring 110 also serving as the urging means, and the other end portion of the rotational axis 81, which has been fitted in the elongate hole 92, moves toward the deep side of the elongate hole 92.

Consequently, the locking portion 82 of the knob 80 is fitted in the concave rotation blocking portion 120 of the housing 20, and as shown in FIG. 1, the bottom of the concave notch of the locking portion 82 abuts against the locking portion 82 of the knob 80, so that the rotation of the knob 80 is blocked, and the locked state of the lock device 40 is maintained.

On the other hand, if an inertial force of the mobile member 30 disappears, as shown in FIGS. 6 and 8, the other end portion of the rotational axis 81, which has been fitted in the elongate hole 92, moves toward the immediate front side of the elongate hole 92 due to the urging force of the return spring 110 also serving as the urging means.

At this time, the locking portion 82 of the knob 80, which has been fitted in the concave rotation blocking portion 120 of the housing 20, falls out of the concave rotation blocking portion 120.

Consequently, releasing of the locking of the lock device 40 becomes capable again.

Incidentally, all contents of the specification, claims, drawings, and abstract of Japanese Patent Application No. 2008-295161 filed on Nov. 19, 2008 are cited in their entirety herein and are incorporated as a disclosure of the specification of the present invention.

What is claimed is:

1. A lock mechanism, comprising:
   a base;
   a mobile member movably supported to the base; and
   a lock device disposed between the base and the mobile member for locking the mobile member, the lock device comprising:
      a lock portion provided on the base and having an engaged portion,
      a pair of bearing portions provided on the mobile member and having two holes facing each other, at least one of the two holes being an elongate hole,
      a rotational shaft provided on the mobile member and having two end portions respectively engaging the two holes,
      a locking portion rotatably attached to the rotational shaft and having an engaging portion at one end portion thereof to engage the engaged portion of the lock portion to lock the mobile member with the base,
      an operating portion integrally formed with the locking portion at a side opposite to the locking portion relative to the rotational shaft to rotate the locking portion locked to the lock portion to release the mobile member from the base,
      a return spring arranged on the rotational shaft and urging the engaging portion toward a direction of being engaged to the engaged portion, and
      a rotation blocking portion formed on the mobile member to block a rotation of the locking portion,
   wherein the locking portion is arranged such that the operating portion rotates the locking portion to release the engaging portion from the engaged portion when one end portion of the rotational shaft supported in the elongate hole is positioned at one end portion of the elongate hole, and the locking portion contacts the rotation blocking portion to block the rotation of the locking portion when the one end portion of the rotational shaft supported in the elongate hole is positioned at another end portion of the elongate hole opposite to the one end portion thereof, and
   the return spring serves as an urging device for urging the one end portion of the rotational shaft toward the one end portion the elongate hole.

2. A lock mechanism according to claim 1, wherein the mobile member is disposed so as to protrude from a back to a front of a vehicle, and in a state wherein the locking portion is engaged to the lock portion, when the mobile member attempts to move in a protruding direction, the one end portion of the rotational shaft moves toward the another end portion of the elongate hole.

3. A lock mechanism according to claim 1, wherein the rotation blocking portion is positioned apart from the locking portion at a predetermined distance when the one end portion of the rotational shaft is positioned at the one end portion of the elongate hole, and the rotation blocking portion contacts the locking portion when the one end portion of the rotational shaft moves to the another end portion of the elongate hole upon movement of the mobile member.

4. A lock mechanism according to claim 1, wherein one of the pair of bearing portions has the elongate hole, and another of the pair of bearing portions has a circular hole wherein another end portion opposite to the one end portion of the rotational shaft is rotatably supported; and the return spring is arranged on the another end portion of the rotational shaft.

5. A lock mechanism according to claim 1, wherein the engaged portion has a U-shape portion and the engaging portion has a hook portion engaging the U-shape portion.

6. A lock mechanism according to claim 5, wherein the locking portion includes one side where the hook portion is formed and another side opposite to the one side, and the rotation blocking portion is arranged below the U-shape portion and is contacted to the another side of the locking portion when the one end portion of the rotational shaft moves toward the another end portion of the elongate hole against an urging force of the urging device upon movement of the mobile member.

7. A lock mechanism according to claim 1, wherein the mobile member has a notched portion notched in a concave shape downwardly from an upper edge at a front side thereof, and the notched portion has a width larger than that of the locking portion relative to a horizontal direction; and a bottom surface of the notched portion forms the rotation blocking portion to contact the locking portion when the one end portion of the rotational shaft moves toward the another end portion of the elongate hole against an urging force of the urging device upon movement of the mobile member.

8. A lock mechanism according to claim 7, wherein the locking portion moves away from the notched portion when the one end portion of the rotational shaft moves from the another end portion of the elongate hole toward the one end portion thereof due to the urging force of the urging device.

9. A lock mechanism according to claim 1, wherein the another end portion of the elongate hole is arranged at a portion closer to the rotation blocking portion than the one end portion thereof; and the locking portion extends upwardly from the rotational shaft, and the operating portion extends downwardly from the rotational shaft.

* * * * *